UNITED STATES PATENT OFFICE.

PAUL REHLÄNDER, OF CHARLOTTENBURG, GERMANY, ASSIGNOR TO CHEMISCHE FABRIK AUF ACTIEN (VORM. E. SCHERING), OF BERLIN, GERMANY.

ARALKYL-PARA-AMINOPHENOL.

No. 922,040.   Specification of Letters Patent.   Patented May 18, 1909.

Application filed September 28, 1907. Serial No. 395,049. (Specimens.)

*To all whom it may concern:*

Be it known that I, PAUL REHLÄNDER, doctor of philosophy, chemist, subject of the Emperor of Germany, residing at Charlottenburg, German Empire, have invented a new and useful Improvement in the Manufacture of Aralkyl-Para-Aminophenols Especially Suitable for Use in Photographic Developers, of which the following is a specification.

I have found that the condensation products from the aromatic aldehydes and para-aminophenol can easily and promptly be reduced by zinc and alkali, and that in this way aralkyl-para-aminophenols are obtained which possess excellent developing properties.

The new bodies answer the formula

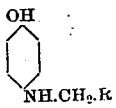

in which formula R represents an aromatic radical. They are difficultly soluble in water, soluble in ether, alcohol and caustic alkalies, and possess both a character of phenol and a basic character, thereby forming the corresponding salts.

Examples.

1. *Preparation of benzyl-para-aminophenol.*—30 grams of benzyl-para-aminophenol (see *Berichte der Deutschen Chemischen Gesellschaft*, Vol. 25, page 2753) are dissolved in an excess of soda lye and then 15 grams of zinc dust are added. After 8 hours continuous stirring the yellow appearance disappears slowly, the reduction is completed and the mixture has a light gray color. While cooling so much acid is added as to render the soda lye neutral, the liquid is then drained off and the solid precipitate extracted by ether. After the distillation of the ether, the new base remains and may be obtained pure by recrystallization from 50% methyl alcohol. The reaction can be represented by the following equation:

Benzyl-para-aminophenol melts at about 89 centigrade. It is difficult to dissolve in water, in ligroin and alkali carbonate, but is easily soluble in alcohol, ether, benzol and caustic alkalies. The chlorhydrate is easily soluble in hot water, difficultly soluble in cold water, while the acetate is easily soluble in cold water.

In the same way other condensation products from aromatic aldehydes and para-aminophenol can easily be reduced.

2. Anisyl-para-aminophenol (methyloxy-benzyl-para-aminophenol) is best obtained in the following manner: 12 grams of anisylidene-para-aminophenol (see *Berichte der Deutschen Chem. Ges.* Vol. 25, page 2754) are well stirred with 40 cubic centimeters dilute soda lye of about 15 per cent. NaOH and 15 cubic centimeters alcohol and then for 5 hours with 6 grams of zinc dust at 60 centigrade. Then the mixture is warmed and filtered. On cooling the sodium compound of the anisyl-para-aminophenol separates as flakes with a golden color. The compound is drained off and dissolved in water. This solution, when neutralized with hydrochloric acid gives the free base, which, when recrystallized from 50 per cent. methyl alcohol, melts at about 102 to 103 centigrade. While the base itself has a similar solubility to the benzyl-para-aminophenol, its salts are much more easily soluble.

3. Salicyl-para-aminophenol (orthoxybenzyl-para-aminophenol) can be produced in a similar way from salicylidene-para-aminophenol (see *Berichte der Deutschen Chem. Ges.* Vol. 25, page 2754) and melts, recrystallized from benzol, at about from 122 to 123 centigrade. The base is difficultly soluble in water, easily soluble in methyl and ethyl alcohol and in hot benzol. The salts are easily soluble in water and can be precipitated from the watery solution by common salt. The precipitate is at first an oily mass, however soon sets.

As already mentioned the aralkyl-para-aminophenols possess excellent developing properties. Their salts better resist the action of the air and can therefore be better preserved than the sulfate of methyl-para-aminophenol known as methyl. A further advantage is that they do not attack the hands of the photographer.

4. For a ready made developer, using benzyl-para-aminophenol for instance, the following composition is advisable: In 900 cubic centimeters of water are dissolved 100 grams crystal soda, 25 grams anhydrous soda sulfite. Then add 6 grams hydroquinone, 0.4 grams potassium bromid, 2 grams benzyl-para-aminophenol chlorhydrate. Preferably the latter is first dissolved in 100 ccm. water. A precipitate is formed which will dissolve on the addition of dilute soda lye, containing 2.1 grams NaOH, in drops and shaking. A good result can also be obtained without soda lye by using 40 grams of tri-sodium phosphate in place of the mentioned 2.1 grams NaOH and omitting the sodium carbonate.

In place of the benzyl-para-aminophenol other aralkyl-aminophenols can be used.

Benzyl-para-aminophenol, anisyl-para-aminophenol and salicyl-para-aminophenol form salts with caustic alkalies which are easily soluble in water but which dissolve with difficulty in concentrated caustic alkalies.

Having now described my invention and in what manner the same is to be performed, what I claim as new and desire to secure by Letters Patent is:

1. The herein described new substance constituting an alkyl-para-aminophenol aromatically substituted in the alkyl group and answering the formula

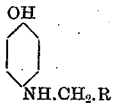

in which R represents an aromatic radical, said substance being difficultly soluble in water, soluble in alcohol, ether and caustic alkalies, forming salts both with acids and alkalies, and having developing properties, substantially as described.

2. The herein described process of producing the herein described substance constituting an alkyl-para-aminophenol aromatically substituted in the alkyl group, which process consists in treating the condensation product from aromatic aldehyde and para-aminophenol with zinc and alkali and isolating the product so formed, substantially as described.

In testimony whereof I have signed my name to this specification in the presence of two subscribing witnesses.

PAUL REHLÄNDER.

Witnesses:
WOLDEMAR HAUPT,
HENRY HASPER